United States Patent [19]

Ishibashi

[11] Patent Number: 5,708,857
[45] Date of Patent: Jan. 13, 1998

[54] MULTI-DIRECTION CAMERA IN COMBINATION WITH A CAR

[75] Inventor: Masamichi Ishibashi, Tokyo, Japan

[73] Assignee: Niles Parts Co., Ltd., Japan

[21] Appl. No.: 717,276

[22] Filed: Sep. 20, 1996

[30] Foreign Application Priority Data

Nov. 1, 1995 [JP] Japan ................ 7-308127

[51] Int. Cl.⁶ .................... G02B 7/18; G03B 23/00
[52] U.S. Cl. ............... 396/21; 396/323; 396/332; 396/351; 396/429; 348/118; 348/148; 359/843
[58] Field of Search .................. 396/322, 323, 396/327, 331, 332, 335, 351, 20, 21, 429; 395/838, 842, 843, 850, 865, 871, 872, 877; 348/61, 64, 113, 114, 118, 143, 148

[56] References Cited

U.S. PATENT DOCUMENTS 2,413,996  1/1947  Ramsdell ................ 396/331
5,349,403  9/1994  Lo ........................ 396/331 X

FOREIGN PATENT DOCUMENTS 1-109447  7/1989  Japan.

Primary Examiner—Safet Metjahic
Assistant Examiner—J. K. Han
Attorney, Agent, or Firm—Ronald P. Kananen

[57] ABSTRACT

A multi-direction camera comprising a mirror 3 having a plurality of reflecting surfaces 31 and 32 disposed in front of a lens 4. The lens 4 receives light reflected from the mirror 3 from a plurality of directions and forms an image by the image sensor 7. The mirror 3 can be moved linearly by an actuator 8. The arrangement of the mirror 3 and lens 4 allows the camera to image road conditions of multiple directions at the same time. The camera can also image a road condition in a single direction with a wider scope manually or automatically when the road condition in that direction needs to be confirmed preponderantly.

5 Claims, 2 Drawing Sheets a c b a c b

MULTI-DIRECTION CAMERA IN COMBINATION WITH A CAR

BACKGROUND OF THE INVENTION

1. Field of the Invention

The present invention relates generally to multi-direction cameras for imaging multiple directions, such as right and left directions of a car and, more particularly, to an improvement of a multi-direction camera that can image multiple directions at the same time by one camera.

2. Description of the Related Art

When one advances into an intersection by a car, for example, it is necessary to confirm his or her safety by perceiving other vehicles regardless of whether a traffic signal exists or not. However, it is often difficult to see right and left road conditions, especially when the line of sight in that direction is partially obstructed.

In order to solve such a problem, a multi-direction camera that allows an operator of a vehicle to confirm his or her safety by imaging right and left road conditions by a camera provided at the front side of a car has been proposed, as disclosed, for example, in Japanese Utility Model Laid-Open Application No. 1-109447.

However, the prior art multi-direction camera described above has had a problem in that although it can image road conditions of multiple directions, such as right and left directions, at the same time, it cannot image a road condition in a single direction with a wide scope.

SUMMARY OF THE INVENTION

Accordingly, it is an object of the present invention to provide a multi-direction camera that can image road conditions in multiple directions at the same time and can image a road condition in a single direction with a wider scope manually or automatically when the road condition in that direction needs to be confirmed preponderantly.

Additional objects, advantages and novel features of the invention will be set forth in part in the description that follows, and in part will become apparent to those skilled in the art upon examination of the following or may be learned by practice of the invention. The objects and advantages of the invention are realized and attained by means of the instrumentalities and combinations particularly pointed out in the appended claims.

In order to solve the aforementioned problem, according to the present invention, there is provided a multi-direction camera in which a mirror having a plurality of reflecting surfaces is disposed in front of a lens to receive light reflected from the mirror from a plurality of directions by a lens to form images on an image sensor, wherein the mirror is supported so as to be movable linearly.

In the preferred embodiment of the invention, the mirror is connected to an actuator so as to be movable linearly by the actuator. One reflecting surface of the plurality of reflecting surfaces of the mirror is set facing the left direction of a car, and the other reflecting surface is set facing the right direction, respectively. The mirror is arranged so as to be movable linearly in the direction perpendicular to the light receiving direction of the lens.

The actuator is connected with a right/left turn signal generating circuit via a controller. The mirror is arranged so as to be movable linearly corresponding to a signal derived from the right/left turn signal generating circuit.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE PREFERRED EMBODIMENTS

A preferred embodiment of the present invention will be described in detail hereinafter with reference to FIGS. 1 to 4.

Figure 1:
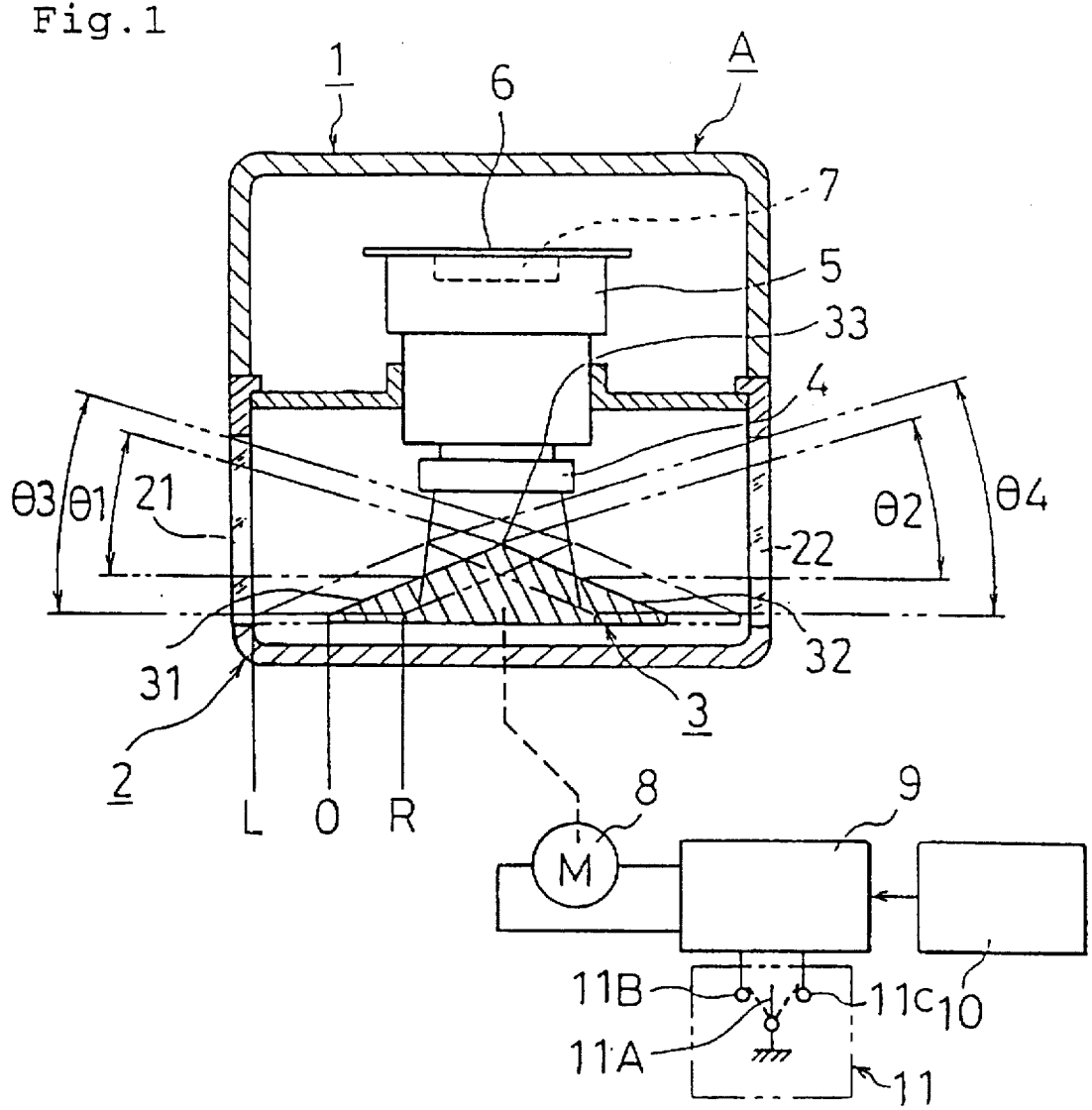
FIG. 1 is a section view showing a main part of a preferred embodiment of the present invention.

In FIG. 1, a multi-direction camera is illustrated comprising a case 1, a cover 2, a mirror 3, a lens 4, a lens mount 5, a substrate 6, an image sensor 7, and an actuator 8. An arrangement of these components will be explained below.

The case 1 is formed by an opaque member and is made up into a predetermined storage box in combination with the cover 2. A packing (not shown) is attached in a junction plane of the case 1 and the cover 2 to make up a water-tight structure.

The cover 2 is opaque, except for right and left windows 21 and 22. The cover 2 is formed by using appropriate means of inserting and forming the right and left windows 21 and 22 formed by transparent acrylic resin into an opaque member. Alternatively, the cover 2 can be formed by painting in black the other part of the cover 2, except for the right and left windows 21 and 22, after forming the entire cover 2 of a transparent acrylic resin, for example.

The mirror 3 is triangular and the mirrored side surfaces thereof are formed by implementing aluminum vapor deposition on two reflecting surfaces 31 and 32 after forming the mirror 3 by synthetic resin. There exists a ridgeline 33 between the two reflecting surfaces 31 and 32.

The mirror 3 is mounted to an actuator 8 and can be moved linearly among positions L, O and R, as shown in FIG. 1, by operating the actuator 8. The moving direction of the mirror 3 is perpendicular to the light receiving direction of the lens 4.

The lens 4 collects light reflected by each of the reflecting surfaces 31 and 32 of the mirror 3. A focus of the lens 4 is set on the surface of the image sensor 7 described later. The lens 4 is attached to the substrate 6, on which the image sensor 7 is mounted, by using the lens mount 5. It is noted that a filter (not shown) is provided within the lens mount 5 in order to block light of wavelength other than visible rays.

Other than the lens mount 5 for supporting the lens 4, a terminal (not shown) is attached to the substrate 6 to be able to electrically connect with an AV (Audio Visual) equipment (not shown) within the car compartment and a controller 9 described later. The substrate 6 is supported elastically by a vibration-proof rubber (not shown).

The image sensor 7 is a device for converting light imaged on the surface of the device into electrical image signals. A CCD sensor is used as the image sensor 7 in the preferred embodiment.

The actuator 8 is constructed by a stepping motor or a solenoid and is connected mechanically with the mirror 3 via an appropriate gear or link mechanism.

Figure 2:
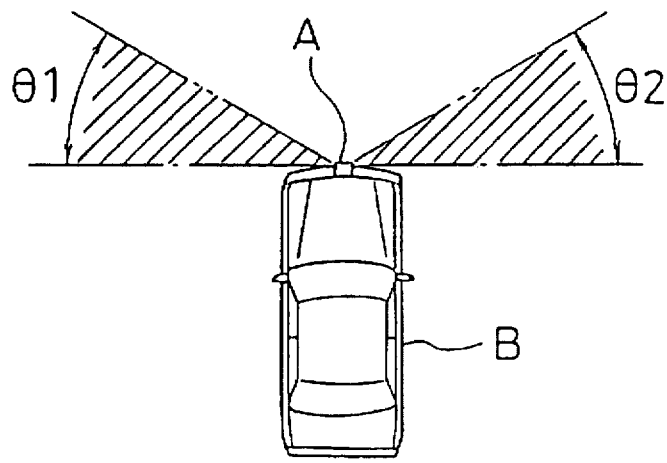
FIG. 2 is a top view of a car in which the unit shown in FIG. 1 is mounted.

A camera A constructed as described above is mounted at the forward section of a car B, e.g., near a bumper section thereof, as shown in FIG. 2, so that the light receiving direction of the lens 4 is set toward the rear side of the car B. The left side reflecting surface 31 faces the left direction of the car B, and the right side reflecting surface 32 faces the right direction of the car B, respectively. When the light receiving direction of the lens 4 is set thus facing the rear side of the car B, the image formed on the surface of the image sensor 7 and the image displayed on the AV equipment turn out as images not inverted laterally, i.e., images just as seen by eyes, thus giving a superior visibility.

The camera A described above is connected to the controller 9. The controller processes signals input from a right/left turn signal generating circuit 10 and a manual switch 11 and controls the actuator 8 corresponding to each of the signals.

The right/left turn signal generating circuit 10 is composed of a turn signal switch and others. The manual switch 11 is a switch manipulated when a driver wants to change the moving position of the mirror 3 manually. The manual switch 11 is equipped with a moving contact 11A and fixed contacts 11B and 11C.

An operation of the embodiment will be explained below.

Figure 3:
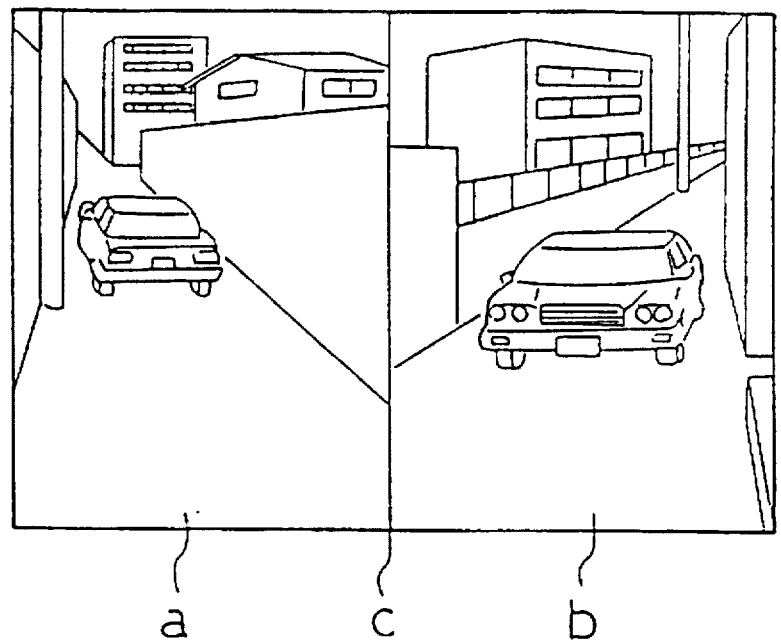
FIG. 3 is an explanatory drawing showing an image formed on the surface of an image sensor shown in FIG. 1 when a moving position of the mirror is at position O.

When the mirror 3 is moved to position O, as shown by a solid line in FIG. 1, a left image (a) from an angle θ1 on the left side and a right image (b) from an angle θ2 on the right side are formed with a rate of one-to-one centering on a boundary line (c), as shown in FIG. 3.

Figure 4:
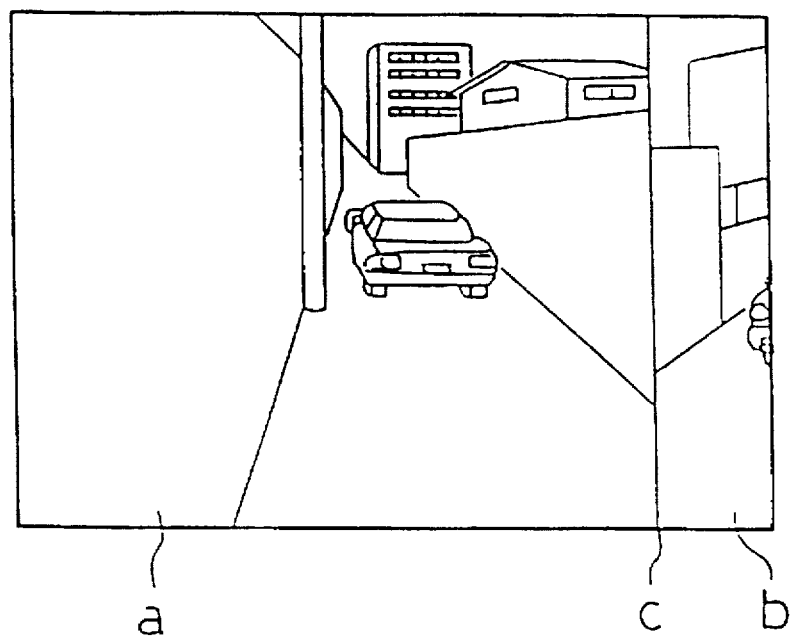
FIG. 4 is an explanatory drawing showing an image formed on the surface of the image sensor shown in FIG. 1 when the moving position of the mirror is at position R.

Next, when the controller 9 inputs a signal indicating a left turn, for example, from the right/left turn signal generating circuit 10, or when a manipulation signal for the left direction is input from the manual switch 11, the controller 9 controls the actuator 8 to move the mirror 3 to the right side, i.e., to the side of position R, as shown by an imaginary line in FIG. 1. Thereby, a left image (a) from a left angle θ3 is formed with a wider scope as compared to the right image (b) on the surface of the image sensor 7, as shown in FIG. 4.

When the controller 9 inputs a signal indicating a right turn, for example, from the right/left turn signal generating circuit 10, or when a manipulation signal for the right direction is input from the manual switch 11, the controller 9 controls the actuator 8 to move the mirror 3 to the left side, i.e., to the side of position L, as shown by an imaginary line in FIG. 1. Thereby, a right image (b) from a left angle θ4 is formed with a wider scope as compared to the left image (a) on the surface of the image sensor 7.

Because the present invention is constructed and has the effect as described above, it can image road conditions in multiple directions at the same time and can image the road condition in a single direction with a wider scope manually or automatically when the road condition of that direction needs to be confirmed preponderantly.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A multi-direction camera in combination with a car, comprising:

a lens having a light receiving direction; and a mirror having a plurality of reflecting surfaces disposed in front of said lens, said lens being arranged to receive light reflected from the mirror from a plurality of directions to form images on an image sensor, said mirror being supported so as to be movable linearly relative to said lens;

wherein one reflecting surface of said plurality of reflecting surfaces of said mirror is set facing a left direction of the car and the other reflecting surface is set facing a right direction of the car, respectively, and said mirror is arranged so as to be movable linearly relative to said lens in a direction perpendicular to the light receiving direction of said lens.

2. The multi-direction camera and car combination according to claim 1, wherein said mirror is connected to an actuator so as to be movable linearly by said actuator, said actuator is connected with a right/left turn signal generating circuit of the car via a controller, and said mirror is arranged so as to be movable linearly corresponding to a signal derived from said right/left turn signal generating circuit.

3. The multi-direction camera and car combination according to claim 1, wherein said direction perpendicular to the light receiving direction of said lens is parallel to said left and right directions, said mirror has a ridgeline at has a ridgeline at an intersection of said reflecting surfaces, and said mirror is movable linearly so that said ridgeline is selectively positioned to the left and right of a central axis of said lens, whereby said multidirection camera can be selectively adjusted to receive a wider image of a road condition in one of said left and right directions while receiving a narrower image of a road condition in the other of said left and right directions.

4. A multi-direction camera in combination with a car, comprising:

a lens; and a mirror having a plurality of reflecting surfaces disposed in front of said lens, said lens being arranged to receive light reflected from the mirror from a plurality of directions to form images on an image sensor, said mirror being supported so as to be movable linearly relative to said lens;

wherein said mirror is connected to an actuator so as to be movable linearly by said actuator; and wherein said actuator is connected with a right/left turn signal generating circuit of the car via a controller, and said mirror is arranged so as to be movable linearly corresponding to a signal derived from said right/left turn signal generating circuit.

5. A multi-direction camera in combination with a car, comprising:

a lens; and a mirror having a plurality of reflecting surfaces disposed in front of said lens, said lens being arranged to receive light reflected from the mirror from a plurality of directions to form images on an image sensor, said mirror being supported so as to be movable linearly relative to said lens;

wherein said plurality of reflecting surfaces of said mirror comprise a first reflecting surface set facing the left direction of the car and a second reflecting surface set facing the right direction of the car, said mirror being linearly movable relative to said lens from a first position in which both of said reflecting surfaces reflect light into said lens and a second position in which only one of said reflecting surfaces reflect light into said lens.

* * * * *